United States Patent

[11] 3,628,989

| [72] | Inventor | Ferruccio Solmi |
| | | Via Baraldi 29, Modena, Italy |
| [21] | Appl. No. | 764,260 |
| [22] | Filed | Oct. 1, 1968 |
| [45] | Patented | Dec. 21, 1971 |

[54] PROCESS FOR THE MANUFACTURE OF GLAZED CERAMIC BODIES, IN PARTICULAR TILES, WITH ONLY ONE FIRING
13 Claims, 6 Drawing Figs.

[52] U.S. Cl. .................................................. 117/70,
106/48, 117/125, 264/62
[51] Int. Cl. ...................................................... C03c 9/00
[50] Field of Search ........................................... 117/125,
70; 264/62; 106/48, 46, 45

[56] References Cited
UNITED STATES PATENTS
| 2,241,705 | 5/1941 | Goodrich .................... | 264/62 X |
| 2,844,693 | 7/1958 | Rigterink ..................... | 106/48 X |

Primary Examiner—Ralph S. Kendall
Attorney—Raymond A. Robic

ABSTRACT: In this process of glazing ceramic bodies, especially tiles, the latter are coated in raw, predried condition with a vitreous glaze admixed with about 25-35 percent of refractory clays and/or kaolin having a grain size of one micron or less, and, after drying the glaze, the bodies are fired only once.

PATENTED DEC 21 1971 3,628,989

INVENTOR
Ferruccio SOLMI

ATTORNEY

PROCESS FOR THE MANUFACTURE OF GLAZED CERAMIC BODIES, IN PARTICULAR TILES, WITH ONLY ONE FIRING

This invention relates to a novel process for the manufacture of glazed ceramic bodies, in particular tiles, with only one firing.

Glazed ceramic bodies in general and glazed facing tiles in particular are composed, as is known, of two separate parts: the ceramic body proper and the layer of vitreous glaze covering the ceramic body in the area required. The ceramic body can be made of single clays or of a mixture of different clays, the composition and nature of which will vary from place to place, while remaining within the limits fairly clearly laid down by the chemical industry. The body of the tile can be composed of kaolin (white paste), or of a mixture of kaolin and clay or of vitreous clays. While a shaped ceramic body can be obtained in various ways tiles, generally speaking, are always produced in the same way. The material is ground, mixed, wetted and finally pressed in special molds by means of mechanical presses. The degree of wetness adopted can vary considerably and in certain cases can be omitted completely.

The body thus obtained is then introduced into the kiln and fired at temperatures ranging between 900° and 1200°–1300° C., depending on the composition of the materials in use. Common clays are usually fired at about 950° C.

Ceramic bodies for glazing are fired twice—once before glazing and again afterwards. The glazing of the tiles can be carried out in various ways, but normally in the tile industry a screen glazer is used; this machine covers the cold tile with a layer of glaze formed of particles of glaze of varying sizes in aqueous suspension. After wet-glazing, the tiles are dried and then introduced into the kiln to fuse the glaze. The glaze must, of course, have a fusion temperature lower than that of the ceramic body of the tile. This manufacturing procedure, based on two quite distinct work phases, is still practically the only one used in the industry.

Many attempts have been made to reduce the two phases to one, that is, to glaze the ceramic body while it is still wet and make do with just one firing, but none has given results acceptable to the industry. Experimentation with the composition of the ceramic ware and the glaze has proved unfruitful. Frequently, a so-called primer (an intermediate layer) is added between the glaze and the ceramic body so as to allow for the varying expansion coefficients and shrinkage of the ceramic body and the glaze. Some partially satisfactory products have in fact been obtained, but in practice they are rejected by the market as they are much inferior to the products obtained by normal procedures.

The object of this invention is to provide a process which enables glazed ceramic bodies in general and glazed tiles in particular to be produced with only one firing. As present interest centers on glazed tiles, they will form the object of the following description; for any ceramics technician the procedural modifications necessary when manufacturing other glazed ceramic bodies will be obvious.

This discovery enables the layer of glaze applied to the raw tile to be of practically the same nature as that used for normal ceramic tiles. The body of the tile may not only be formed of the most varied mixtures of clay and kaolin but also if may consist of ordinary clay by itself, which, as has been observed, varies from locality to locality. In other words, the procedure completely general in character and can be adopted in any ceramic factory to process the normal clay hitherto in use, no matter where it comes from.

The same process can be adopted for the manufacture of normal bricks or roofing tiles with one or more glazed surfaces.

The process discovered is summarized by the following operations, listed chronologically:

1. Grinding the clay or a mixture of clays which may be chemically tinted or bleached;
2. Forming the tiles by compressing the slightly dampened powder;
3. Drying the tiles thus obtained;
4. Glazing the raw tiles with clear or semiclear glazes or with opaque glazes which are then faced with a clear glaze (two layers);
5. Drying the glaze, which may be effected simply by passing the tiles under infrared lamps;
6. Flat-firing the tiles in normal tubular tile kilns, for which operation the tiles are placed on recoverable tile trays made of refractory material.

The first operation is carried out with normal clay mills as used by the ceramic industry. A relatively coarse grain size results, so that when the powder is rubbed between the fingertips grains can be felt. The fourth operation is carried out using the normal glaze as used in the industry, that is material ground in drum mills; it looks to be extremely fine but when it is rubbed between the fingertips as in the previous case granulation can be felt, even though it contains a high percentage of barely perceptible grains.

The foregoing applies equally, as has been noted, to bricks, solid or perforated, and to roofing tiles, etc. As bricks are generally extruded, operation (2), that is pressing, is simply replaced by extrusion. In this case the excessively smooth extruded surface is preferably somewhat roughened, either by hand or by placing scrapers along the line of travel of the extruded block so that they come into contact with the surface to be glazed. Instead of scraping one could trim off a fine layer of material. Scraping or trimming eliminates the extremely fine colloidal particles that come to the surface during extrusion.

At this point one may ask in what way the present invention is technically different from other similar procedures described in national and foreign patents. As has been previously pointed out all the processes adopted to date fail to produce an acceptable result. Defects are found, for example, in the glazing, which means that the product cannot be compared with that produced by conventional means. Such defects are found particularly in facing tiles. For the most part they are widespread, deep dunting and a lack on the glazed surfaces of that lustre and brilliant color which constitute the attraction of the normal glazed tile.

After long tests and many experiments the applicant succeeded, and in this lies the gist of the invention, in incorporating into the normal glaze a substance which, without impairing or diminishing the aesthetic effect of the glaze, anchors the glaze perfectly to the ceramic material. This is achieved in such a way that during firing the glaze molds itself perfectly to the surface of the tile without dunting or damaging effects despite the inevitable shrinkage and internal tension phenomena which occur with very different coefficients in the ceramic material and in the glaze. The applicant has thus succeeded in isolating and exploiting for industrial use physical and chemical principles which render possible once-fired glazed tiles to become in every way similar to those now in the market. The invention, therefore, applies both to the process and to the glazed ceramic bodies, in particular glazed tiles, obtained by it, which in this respect are considered as new industrial products.

The process is based on the manipulation and composition of the glaze. In order to obtain the desired result, common vitreous glazes are mixed with relatively refractory natural or artificial clays or with kaolins composed of grains or particles of 1 micron or even less. Such a reduced grain size can be achieved artificially using suitable mills and decanting tanks, but in practice this operation is eliminated as there are, on the surface of the earth, vast deposits of natural clays or kaolins with the necessary grain size and thus ready for use. These clays are easily recognizable on first inspection by touch alone. By rubbing a little between finger and thumb, no grains can be felt; indeed, the material is so fine as to feel almost greasy. The clays and kaolins or mixtures of the same with the required grain size are mixed with the normal vitreous glaze in the percentage which may vary between about 25 and 35 percent. In practice, 25 percent proved most effective with a 10 percent addition of another more refractory clay or kaolin of considerably coarser grain size. In this may a sort of "poles"

are created around the single refractory grains with a high-fusing point, or rather a lattice of "poles" is created within the glaze.

The invention will now be described in greater detail with reference to the appended drawing, which, in the form of a completely simplified ideal scheme, illustrates the granulometry of the process. In said drawing.

Figure 1:
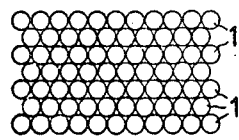
FIG. 1 shows the scheme of round grains of equal size placed one on top of the other so as to occupy all the available space.

In the embodiment of FIG. 1; (1) indicates the granules of ground glaze used in the screen-glazing process. In order to simplify the explanation and the drawing the grains of glaze are shown hypothetically to be of the same size. Thus, covering a tile with an aqueous suspension of uniform grain glaze one would obtain the structure shown in FIG. 1 by the theory of sedimentation. Taking into account the nature of the screen-glazing process, in which water passes from the glaze into the tile by a process of absorption, one may suppose that all the granules settle in such a way as to occupy the greatest space possible, that is to say, they take up the position shown in FIG. 1.

Figure 2:
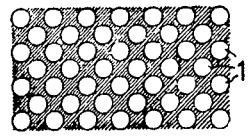
FIG. 2 shows a scheme whereby the round grains of FIG. 1 are placed one on top of the other and evenly spaced with the intervening spaces taken up by a hypothetical filler of infinitely small grain size.
Figure 3:
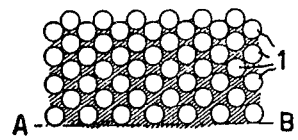
FIG. 3 shows another ideal scheme derived from FIG. 2 in which, as the distance between the baseline AB and the granules gradually increases so the granules draw closer and closer together until they finally touch.
Figure 4:
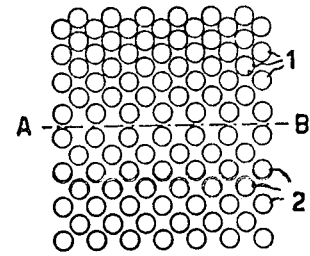
FIG. 4 shows the schemes of FIGS. 2 and 3 placed one above the other so that one becomes the combination of the other.
Figure 5:
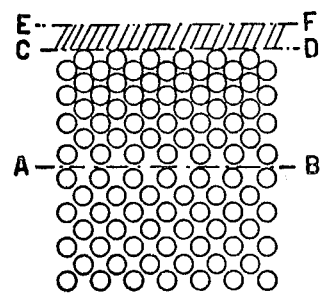
FIG. 5 is a modification of FIG. 4.
Figure 6:
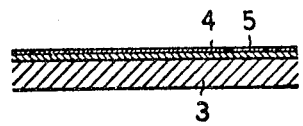
FIG. 6 shows the cross section of glazed tile obtained by the procedure according to the invention.

Let us now examine FIG. 2, which is based on the hypothesis that the granules (1) must be kept apart and evenly spaced. Technically speaking, there is only one way to achieve this: the intervening spaces must be filled with a powder of smaller grain size. The smaller the grain size the closer the grains can come together without actually touching. To this end it is sufficient to prepare a specially proportioned mixture. Ideally speaking, by varying the proportions of the mixture one is able to vary at will the distance between each grain (1). One is now faced with the problem of whether it is technically possible to achieve the scheme shown in FIG. 3, in which the distance between the grains (1) decreases further the grains are from the baseline AB. It can in fact be achieved by making a aqueous suspension of the granules (1) mixed with a powder of appropriate grain size. When this suspension is poured over a porous ceramic body, as is the case during glazing with a normal screen-glazer, the absorption brought about by the porous body concentrates the fine powder in the lower part towards the baseline AB; meanwhile, the granules (1) tend to draw towards one another in an upwards direction since, because the filler tends to settle towards the baseline AB following the flow of absorbed water, there is no filler to keep them apart. This phenomena is shown schematically in FIG. 4, where the circles (2) below the line AB represent the granules of ceramic material while the circles (1) represent the granules of the glaze. To simplify the explanation, granules (1) and (2) are hypothetically assumed to be of the same size. Actually they are different but their size category is to all intents and purposes the same when it is considered in relation to the size of the grains of the filler between granules (1). The intervening spaces between the clay granules (2) are hypothetically occupied by smaller granules of clay, or they are brought into contact with one another by deformation due to pressure. In any event, hypothesis apart, the schematically represented ceramic body below the line AB is most certainly a porous body with internal cavities and a rough surface. Thus, when a layer of glaze (1) is poured over it by the screen glazer the micrometric powder in the glaze flows downwards, filling all the surface cavities of the ceramic body and all the lower layers of the granules (1). Furthermore, it is seen, as stated above, that the topmost granules (1) are to a large extent cleansed of filler and therefore lodge one against the other. By pouring over them a layer of glaze composed only of granules (1) without the addition of filler (see FIG. 5) we are left with a layer of pure glaze on top, represented by the shaded portion followed by a layer of glaze becoming progressively more impure (from CD to AB) due to the increasing proportion of filler resting finally on ceramic layer below line AB. In practice the relative thicknesses of the various layers shown in FIG. 5 are very different. FIG. 6 gives a clear idea of the true relationship. In FIG. 6, (3) represents the cross section of the ceramic body of the tile, corresponding to the part below the line AB in FIG. 5; (4) represents the first layer of glaze corresponding to that seen between the lines CD to AB; (5) represents the second layer of glaze, as seen between the lines EF and CD.

The body (3) is formed by stamping or by extrusion, using powders ground to fairly coarse grain size, relatively speaking, comparable to that of glass in aqueous suspension. So far we have spoken in simplified hypothetical terms; in practice granules never have a uniform grain size, but it is obvious that when the micrometric grain size powder is used for the glaze illustrated by layer (4) we achieve in practice what has been seen in theory. During glazing, a sedimentation of the glaze takes place onto the surface of the tile, resulting in a lot of clay at the bottom and little at the top. By using appropriate quantities of water in the preparation of the glaze suspension, wet glazing leaves the topmost granules almost clean, such is the facility with which the micrometric clay particles sink following the flow of absorbed water. It is further clear that the micrometric clay particles that come into contact with the ceramic body (3) are absorbed into all the surface pores of the previously dried ceramic body (3). Maximum contact surfaces are eagerly sought and this phenomenon in itself already produces a welded surface because of the affinity the clay materials have for one another. Each cavity or roughness in the surface of the body (3) is sought out and filled by the micrometric clay particles which thus form "anchorage roots" for a special clay structure which, starting from the surface of the body (3), assumes a three-dimensional lattice formation of glaze granules occurring in ever closer proximity one to another, the closer they are to the surface of the glazed tile.

When these glazed raw tiles are introduced into the kiln the filler between the glaze granules hardens as soon as it is dry and bakes before the glaze begins to fuse. In this way the layer of glaze seen in FIG. 3 forms, in its lower part, a sort of rigid lattice which as well as being perfectly welded to the lower ceramic body (3) forces the glaze particles to follow the shrinkage. That is, the latter particles, which fuse in a very viscous, never a liquid, state, gradually settle into place without undergoing any creeping on the surface of the body (3). Furthermore, the surface layer is almost pure glaze so that, when cooled, the tile appears glazed yet has a rather dull appearance. This is due to the presence of micrometric clay particles which form a cloudy suspension. By adjusting the proportions of the glaze accordingly it is possible to obtain a bright surface, or nearly so. However, this is obtained must more easily by applying a second, very thin layer (5) of pure glaze which gives the tile normal brilliance. An extremely thin layer is sufficient because, in addition, the water of this second layer cleans the topmost granules of the first layer once again and carries the granules of micrometric clay further down.

Clearly, the glaze formula can be varied infinitely provided that the above physical and physicochemical characteristics are obtained. An example of a formula which has given us excellent results is as follows:

| | |
|---|---|
| Clay A | 25% |
| Clay B | 10% |
| Glaze crystal C | 65% | in which A is a natural clay with the following composition:

| | |
|---|---|
| $SiO_2$ | 56.5% |
| $Al_2O_3$ | 26% |
| $Fe_2O_3$ | 2.5% |
| $TiO_2$ | 0.2% |
| CaO | 2% |
| MgO | 2.5% |
| $K_2O+Na_2O$ | 6% |
| Loss at firing ($H_2O$) | 4.3% |

B is a natural clay with the following composition:

| | |
|---|---|
| $SiO_2$ | 58% |
| $Al_2O_3$ | 29.1% |
| $Fe_2O_3$ | 0.5% |
| CaO | 0.5% |
| $K_2O+Na_2O$ | 3.6% |
| Loss at firing ($H_2O$) | 8.3% | and C is a crystalline substance with the following composition:

| | |
|---|---|
| PbO | 0.106 |
| $K_2O$ | 0.262 |
| $Na_2O$ | 0.264 |
| CaO | 0.262 |
| MgO | 0.106 |
| $Al_2O_3$ | 0.174 |
| $SiO_2$ | 5.08 |
| $B_2O_3$ | 0.94 |

The coloring of the glazes is achieved by adding to them metallic oxides or coloring clays, as is known in the art. By applying layers of different colors and designs to the surface of the topmost layer it is possible to obtain colored decorations and designs in every way similar to those applied to conventional glazed tiles. As has already been observed the tile is flat-fired on a special flat tray of refractory material as it is raw and relatively fragile. Firing is carried out in tube kilns or also tunnel kilns; in the latter case refractory kiln cars of a suitable size are used with the tile and its refractory setter slab about twice the thickness of a normal tile.

What has been said for tiles also holds good for ceramic bodies in general and for bricks and roofing tiles in particular. It is clear that irregularly shaped ceramic bodies, for example vases, shaped by techniques other than pressing, must be rapidly dipped when still raw into the aqueous glaze suspension. The pure glaze layer (5) can be sprayed on in this case.

What has been described and shown above is of a purely schematic nature. In practice obvious variations can take place without going outside the scope of the present invention. The principle, however, remains firm: the first layer of glaze must be mixed with a clay or ceramic substance of micrometric grain size.

I claim:

1. Process for the manufacture of glazed ceramic bodies comprising: forming a raw ceramic body: drying said body; coating at least a portion of said ceramic body with a vitreous glaze admixed with about 25-35 percent of refractory clays, kaolin or mixtures thereof having a grain size of at most about 1 micron; drying the so coated glaze; and firing the glazed ceramic body only once.

2. Process according to claim 1, in which said coating is effected with a vitreous glaze admixed with about 25 percent of the refractory clay or kaolin having a grain size of at most about 1 micron, and with a further 10 percent of another more refractory clay or kaolin having a grain size between 1 and 8 microns.

3. Process according to claim 1, in which said coating is effected with a mixture consisting of 25 percent of clay A, 10 percent of clay B and 65 percent of glaze crystal C, the respective compositions of which are:

Clay A: $SiO_2$—56.5%; $Al_2O_3$—26%; $Fe_2O_3$—2.5%; $TiO_2$—0.2; CaO—2%; MgO—2.5%; $K_2O+Na_2O$—6%; $H_2O$ loss at firing—4.3%.

Clay B: $SiO_2$—58%; $Al_2O_3$—29.1%; $Fe_2O_3$—0.5%; CaO—0.5%; $K_2O+Na_2O$—3.6%; $H_2O$ loss at firing—8.3%.

Glaze crystal C: PbO—0.106; $K_2O$—0.262; $Na_2O$—0.264; CaO—0.262; MgO—0.106; $Al_2O_3$—0.174; $SiO_2$—5.08; $B_2O_3$0.94.

4. Process according to claim 1, in which said coating is effected by applying a first layer of the glaze admixed with the refractory clays, kaolin or mixtures thereof in aqueous suspension and, on top of said first layer, a second very thin layer of unadmixed glaze, whereby a brilliant surface finish is obtained.

5. Process according to claim 1, in which said coating is effected by applying onto the ceramic body the glaze admixed with the refractory clays, kaolin or mixtures thereof and dispersed in a quantity of water sufficient to cleanse the uppermost surface of the glaze so that substantially all particles of clay and kaolin are removed from the said surface during absorption of the water by the ceramic body, whereby a brilliant surface finish is obtained.

6. Process according to claim 1, for the manufacture of ceramic wall and floor tiles, in which the raw ceramic tiles are formed by compression in the tile molds, then dried; a predetermined surface of the tile is then coated with the vitreous glaze admixed with the refractory clays, kaolin or mixtures thereof, said coating being effected with a screen glazer; the coated tile is then dried and fired once in a kiln on a refractory setter slab which holds it in horizontal position through the firing operation.

7. Process according to claim 2, in which said coating is effected by applying a first layer of the glaze admixed with the refractory clays, kaolin or mixtures thereof in aqueous suspension and, on top of said first layer, a second very thin layer of unadmixed glaze, whereby a brilliant surface finish is obtained.

8. Process according to claim 2, in which said coating is effected by applying onto the ceramic body the glaze admixed with the refractory clays, kaolin or mixtures thereof and dispersed in a quantity of water sufficient to cleanse the uppermost surface of the glaze so that substantially all particles of clay and kaolin are removed from the said surface during absorption of the water by the ceramic body, whereby a brilliant surface finish is obtained.

9. Process according to claim 2, for the manufacture of ceramic wall and floor tiles, in which the raw ceramic tiles are formed by compression in the tile molds, then dried; a predetermined surface of the tile is then coated with the vitreous glaze admixed with the refractory clays, kaolin or mixtures thereof, said coating being effected with a screen glazer; the coated tile is then dried and fired once in a kiln on a refractory setter slab which holds it in horizontal position through the firing operation.

10. Process according to claim 3, in which said coating is effected by applying a first layer of the glaze admixed with the refractory clays, kaolin or mixtures thereof in aqueous suspension and, on top of said first layer, a second very thin layer of unadmixed glaze, whereby a brilliant surface finish is obtained.

11. Process according to claim 3, in which said coating is effected by applying onto the ceramic body the glaze admixed with the refractory clays, kaolin or mixtures thereof and dispersed in a quantity of water sufficient to cleanse the uppermost surface of the glaze so that substantially all particles of clay and kaolin are removed from said surface during absorption of the water by the ceramic body, whereby a brilliant surface finish is obtained.

12. Processing according to claim 3, for the manufacture of ceramic wall and floor tiles, in which the raw ceramic tiles are formed by compression in tile molds, then dried; a predetermined surface of the tile is then coated with the vitreous glaze admixed with the refractory clays, kaolin or mixtures thereof, said coating being effected with a screen glazer; the coated tile is then dried and fired once in a kiln on a refractory setter slab which holds it in horizontal position through the firing operation.

13. Once-fired glazed ceramic bodies, in particular tiles, without dunting or damaging effects, as obtained by the process according to claim 1.

* * * * *